United States Patent
Takeda et al.

(10) Patent No.: US 6,438,075 B1
(45) Date of Patent: Aug. 20, 2002

(54) LIGHT-PICK-UP DEVICE AND LIGHT SOURCE UNIT INCORPORATED IN THE SAME

(75) Inventors: Tadashi Takeda; Yoshio Hayashi; Taminori Masuzawa, all of Nagano (JP)

(73) Assignee: Kabushiki Kaisha Sankyo Seiki Seisakusho, Nagano (JP)

( * ) Notice: Subject to any disclaimer, the term of this patent is extended or adjusted under 35 U.S.C. 154(b) by 0 days.

(21) Appl. No.: 09/449,905

(22) Filed: Dec. 2, 1999

(30) Foreign Application Priority Data

Dec. 3, 1998 (JP) .......................................... 10-343884
Dec. 8, 1998 (JP) .......................................... 10-347700

(51) Int. Cl.[7] ................................................ G11B 7/00
(52) U.S. Cl. ................................ 369/44.12; 369/44.37; 369/112.04
(58) Field of Search ........................... 369/44.12, 44.14, 369/44.37, 112.04, 112.05, 112.07, 112.1, 112.15, 44.23

(56) References Cited

U.S. PATENT DOCUMENTS 5,446,719 A * 8/1995 Yoshidat et al. .......... 369/44.37
6,023,448 A * 2/2000 Tajiri et al. ............. 369/112.04
6,072,607 A * 6/2000 Tajiri et al. ............. 369/112.04

* cited by examiner

*Primary Examiner*—Thang V. Tran
(74) *Attorney, Agent, or Firm*—Sughrue Mion, PLLC

(57) ABSTRACT

A returning light beam from an optical disc is divided by a separating diffractor in the directions perpendicular to a track direction of the optical recording medium, and according to respective illuminances of the divided light beams, a deviation amount of an objective lens to an optical axis is detected. By feedback-controlling an objective lens driver by using the information of the detected deviation amount, the objective lens can be made to become stationary at the desired position in a short time. Accordingly, a time period required for the oscillation attenuation of the objective lens can be shortened, thereby, a time period for the reproduction can be shortened.

17 Claims, 16 Drawing Sheets

LIGHT-PICK-UP DEVICE AND LIGHT SOURCE UNIT INCORPORATED IN THE SAME

BACKGROUND OF THE INVENTION

The present invention relates to a light pick-up device and a light source unit incorporated in the same. In the light pick-up device, laser light from a laser light source is converged onto an optical recording medium through an objective lens, and recording information of the optical recording medium is reproduced by receiving the returning light beam from the optical recording medium by a photo detector.

The light pick-up device to reproduce an optical disk such as a CD or a DVD, is provided with an objective lens driver to converge the laser light for reproducing onto a track position on the target optical disk. The objective lens driver includes a mechanism for movably supporting the objective lens in the optical axis direction of the laser light and in the radius direction of the optical disk, and a mechanism for moving the objective lens supported by the supporting mechanism in the optical axis direction of the laser light and in the radius direction of the optical disk. Generally, the supporting mechanism uses the force of a spring such as a mechanical spring or a magnetic spring, to hold the objective lens at a predetermined neutral position.

For example, there has been proposed an axial sliding type objective lens driver wherein the objective lens is finely moved in the radius direction of the disk by rotating a lens holder holding the objective lens around a rotation axis of the holder.

Being not limited to the above type objective lens driver, generally when the lens holder is moved, the larger inertia force acts on the objective lens when the lens holder is moved in the radius of the disk (at the time of the tracking correction), as compared to when the lens holder is moved in the optical axis direction (at the time of focusing correction). Accordingly, even though the objective lens is tried to stop at a desired position, the lens holder holding the objective lens receives the force oscillating in the radius of the disk, and it is necessary to wait the attenuation of the oscillation of the objective lens until the objective lens becomes stationary at the desired position. Accordingly, there is a problem that the reproduction of the recording information takes a long time period.

SUMMARY OF THE INVENTION

In view of the foregoing, the object of the present invention is to provide a light pick-up device a light source unit incorporated in the same by which, even when the objective lens driver is moved in the radius direction of the disk, the objective lens can become stationary at the desired position in a short time period.

Further, in such the light pick-up device, the relative position of the semiconductor laser and the optical element, or the relative position of the reflection mirror and the light detector largely affects the characteristic of the device. Accordingly, the second object is to provide a light pick-up device by which the adjustment of the relative position of each optical element constituting the optical system of the device can be easily carried out.

In order to achieve the above objects, there is provided a light pick-up device comprising:
 a laser light source for emitting a laser light beam;
 an objective lens for converging the laser light beam on an optical recording medium;
 a photo detector for detecting a light beam reflected by the optical recording medium;
 a first diffractor for separating the light beam emitted from the laser light source and the light beam reflected by the optical recording medium in it's different optical paths the first diffractor having a diffraction grating pattern for dividing the reflected light beam in a direction perpendicular to a track direction of the optical recording medium such that an optical axis of the reflected light beam becomes the center of division in order to generate a first divided light beam and a second divided light beam; and
 a signal processor for generating a reproduction signal in accordance with the detection of the photo detector, the signal processor including a lens deviation detector for detecting a deviation amount of the objective lens from the optical axis, in accordance with respective illuminances of the first and second divided light beams.

In the device, the deviation amount of the objective lens from the optical axis is detected in the lens deviation detector according to the illuminance of the first and the second divided light beams. Accordingly, when the lens drive mechanism is feedback-controlled according to the detection result of the deviation detector, the objective lens can become stationary at the desired position in a short time. Accordingly, the time period for the oscillation attenuation of the objective lens can be shortened, thereby, a high speed operation of the reproduction of the recording information can be attained.

Herein, the illuminance of the reflected light beam from the optical recording medium fluctuates according to the depth of a plurality of pits forming the track or the shape of edges of the pit. Therefore, preferably, the signal processor includes a peak holder to hold respective peak values of the received illuminance in the first and the second divided light beams. Accordingly, the deviation amount of the objective lens can be accurately detected.

Preferably, the light pick-up device further includes a second diffractor for dividing the light beam emitted from the laser light source into a main beam and two subsidiary beams, in order to detect a tracking error of the objective lens by the 3-beam method. In the device, the reflected light beam of the main beam may be divided by the first diffractor in order to conduct the lens deviation detection.

When the reflected light beam of the main beam is subjected to the division of the first diffractor, the respective illuminances of the divided light beams (the first and second divided light beams) are compared to each other, and by feedback-controlling the position of the objective lens so that these amounts become the same, the objective lens can be made to become stationary in a short time at a position which coincides with the optical axis from the light source.

Preferably, the second diffractor has a diffraction grating pattern which is periodically arranged in a direction slanting a predetermined angle with respect to the track direction. Accordingly, by only attaching the second diffractor to a frame body or a light source unit, the light spot of each beam can be formed at appropriate positions on the track so that the tracking error signal is obtained from two subsidiary beams. Namely, in order to adjust the forming position of the light spot, it is not necessary to adjust the angle of the second diffractor with respect to the optical axis.

The light pick-up device of the present invention can be applied not only to the light pick-up device in which the laser light source or the first diffractor are separately assembled to the frame, but also to the light pick-up device in which these are assembled into a common package body to constitute single light source unit. Preferably, the photo detector and the signal processor are provided on a common semiconductor substrate.

In such the device, since the relative position of the semiconductor laser and the optical elements, or the relative position of the reflection mirror and the photo detector largely affects the device performance. Preferably, there is provided a positioning mark on the semiconductor substrate for specifying a mounting position of the laser light source. Utilizing the mark as a sign, the laser light source can be accurately positioned with respect to the photo detector.

In order to easily regulate positions of the front, rear, left and the right of the laser light source on the surface of the substrate, preferably, the positioning mark includes a first pair of marks arranged in a first direction parallel to the optical axis of the laser beam and a second pair of marks arranged in a second direction perpendicular to the first direction.

In order to accurately form the positioning mark on the surface of the substrate by a simple operation, the positioning mark may be simultaneously formed at the time of exposure by which the photo detector is formed on the surface of the semiconductor substrate.

In the device, when the respective illuminances of the first and second divided light beams are designed to be the same under the condition that the first diffractor is correctly positioned, the off-set amount of the first diffractor can be detected from the difference between the illuminances of the two divided light beams. Accordingly, the position of the first diffractor may be adjusted to a position at which the off-set amount becomes zero. As described above, according to the present invention, the position deviation of the first diffractor can be clearly found, thereby, the adjustment of its position can be accurately conducted.

DETAILED DESCRIPTION OF THE PREFERRED EMBODIMENTS

Referring to the accompanying drawings, embodiments of the present invention will be described below.

Overall Structure of the Light Pick-up Device

Figure 1:
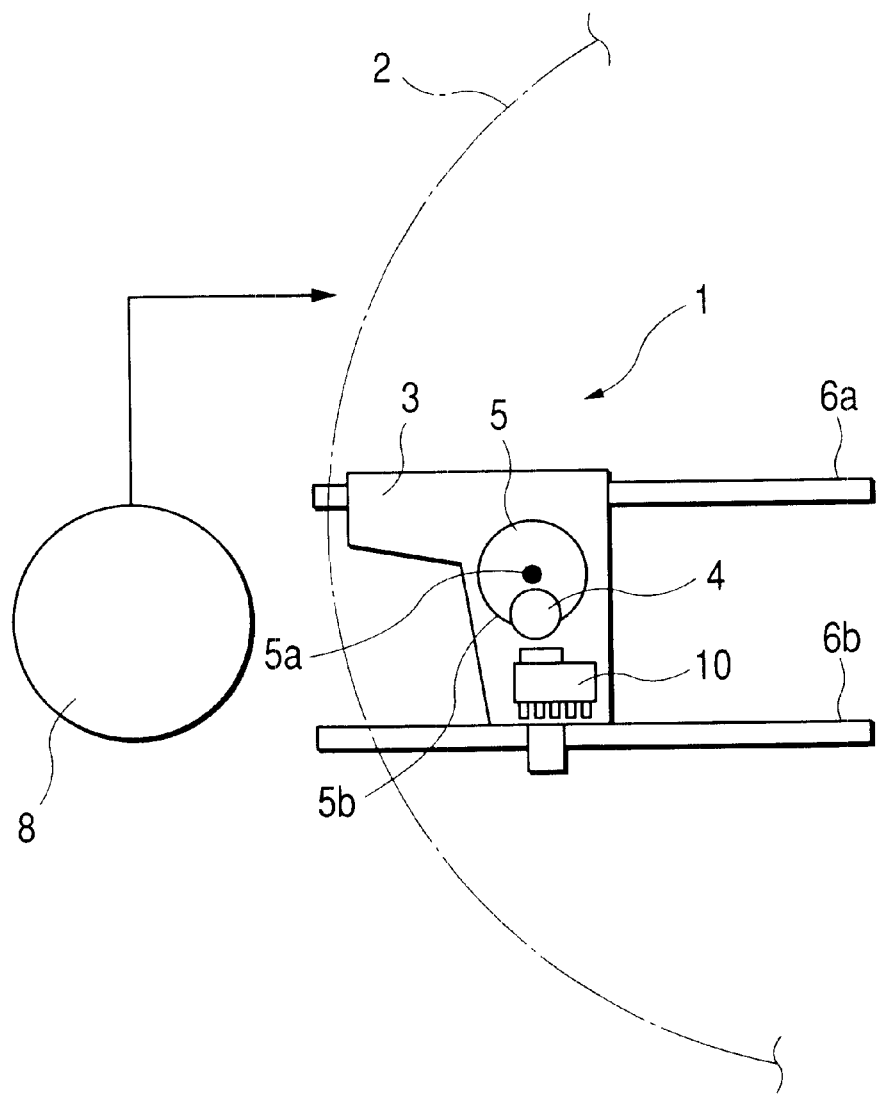
FIG. 1 is a schematic view showing a configuration of a light pick-up device to which the present invention is to be applied.

FIG. 1 is a schematic plan view showing a configuration of a light pick-up device to which the present invention is to be applied. In this view, the situation that an optical disk 2 is loaded in a reproduction apparatus (not shown) in which the light pick-up device is installed, is shown. The optical disk 2 is, in an ordinary manner, rotated and driven by a spindle motor 8 assembled in the reproduction apparatus.

The light pick-up device 1 comprises: an objective lens 4 arranged at a position at which it can face the loaded optical disk 2; an objective lens driver 5 which holds the objective lens 4 and conducts a predetermined movement; a light source unit 10 which emits laser light which is irradiated on the optical disk 2 through the objective lens 4; and a frame 3 in which these objective lens driver 5 and the light source unit 10 are mounted. The objective lens driver 5 moves the lens 4 in the focusing direction and in the tracking direction.

The frame 3 is slidably supported by a pair of guide shafts 6a and 6b provided in the reproduction apparatus, and the frame 3 can be reciprocated in the radial direction of the optical disk 2 along these guide shafts 6a and 6b by the driving motor (not shown). As the frame 3 moves, the overall optical system of the light pick-up device 1 is moved in the radial direction of the optical disk 2.

As the objective lens driver 5, the axial sliding type one may be used, which can finely move the objective lens 4 in the disk radial direction (tracking correction direction) by rotating the lens holder 5b holding the objective lens 4 around a sliding shaft 5a by a well-known magnetic driving mechanism. In the same manner, by the magnetic driving mechanism, by moving the lens holder 5b upward and downward along the sliding shaft 5a, the objective lens 4 can also be finely moved in the optical axis direction (focusing correction direction). Further, the objective lens 4 is held at a predetermined neutral position by using a magnetic spring.

The Optical System of the Light Pick-up Device

Figure 2:
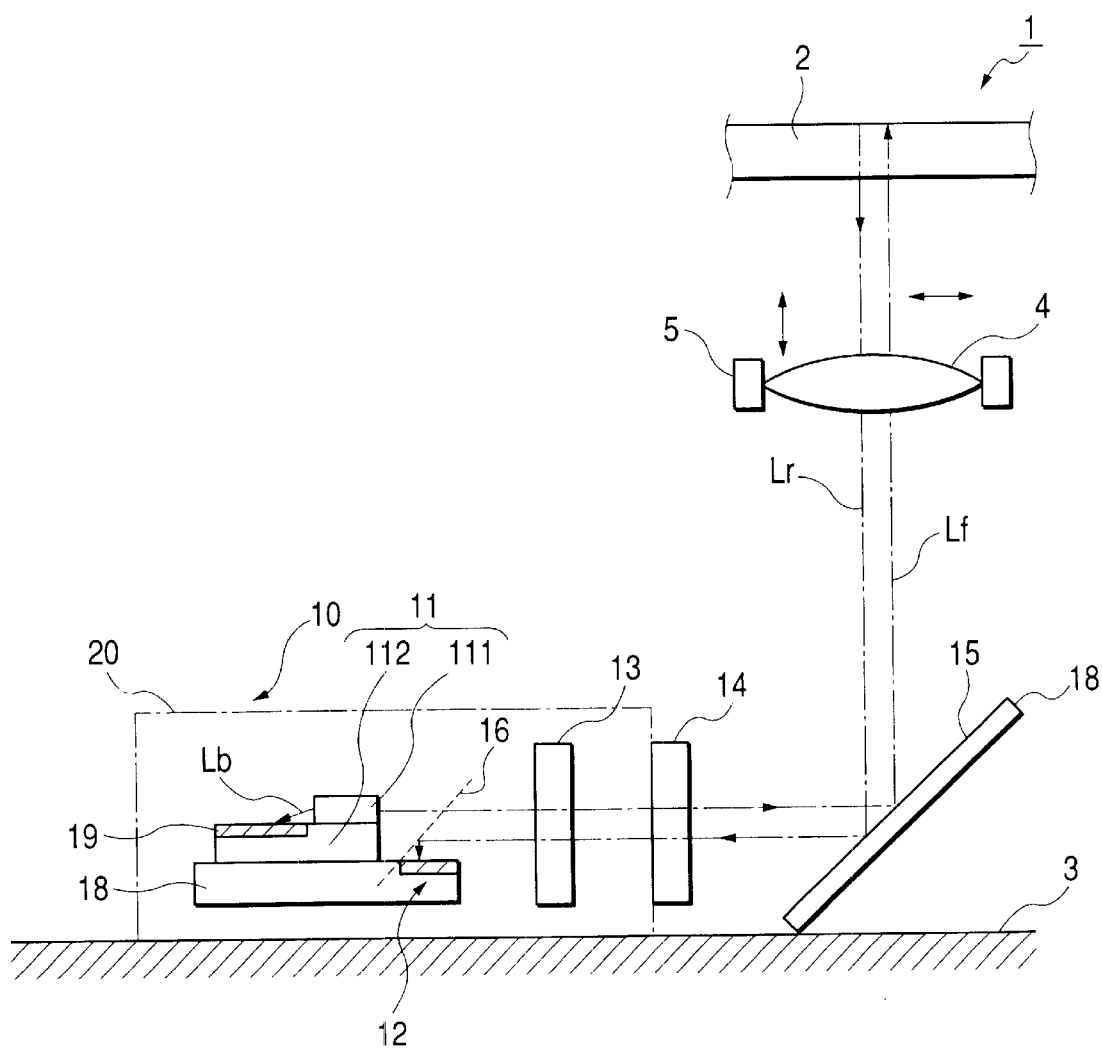
FIG. 2 is a schematic view showing a configuration of an optical system of the light pick-up device shown in FIG. 1.

FIG. 2 is a schematic view showing an optical system of the light pick-up device. The light pick-up device comprises the laser light source 11 and the photo detector 12. The optical system of the light pick-up device 1 is structured in such a manner that the laser light Lf emitted from the laser light source 11 is divided into three beams of a main beam (zero-order light) and two subsidiary beams (positive and negative first-order lights) through the 3-beam generating diffractor 13, the three beams pass through the separating diffractor 14 as they are, they are guided to the objective lens 4 through the reflection mirror 15, and are converged onto the recording surface of the optical disk 2 through the objective lens 4.

The returning light beam Lr reflected on the recording surface of the optical disk 2 returns to the separating diffractor 14 through the objective lens 4 and the reflection mirror 15, and is subjected to the diffraction action herein, and the returning direction is deflected in the different direction from the emitted laser light Lf, and the returning light beam Lr passes through the 3-beam generating diffractor 13 as it is, and is guided to the reflector 16, reflected herein, and reaches the light receiving cell of the photo detector 12.

In these optical elements, the laser light source 11, the photo detector 12, the diffractors 13 and 14, and the reflector 16 are assembled in a common package 20, and are integrally structured as one light source unit 10.

Light Source Unit

Figure 3C:
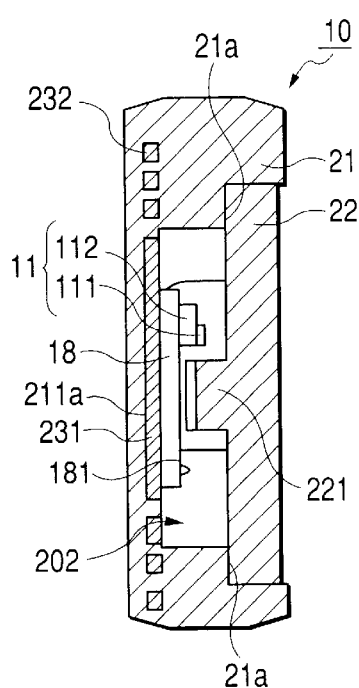
FIG. 3C is a sectional view taken along the line 3C–3C shown in FIG. 3A.
Figure 3A:
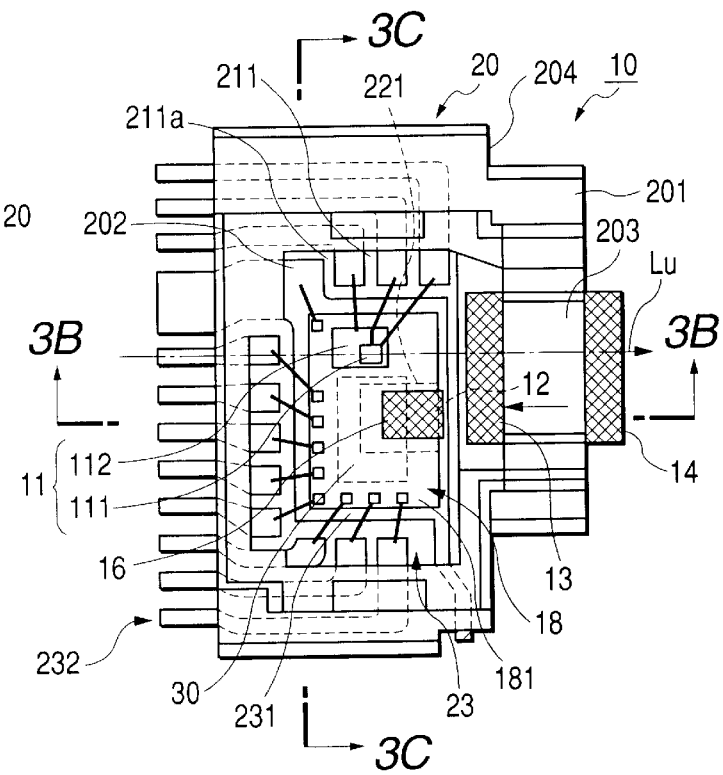
FIG. 3A is an schematic plan view showing a light source unit.
Figure 3B:
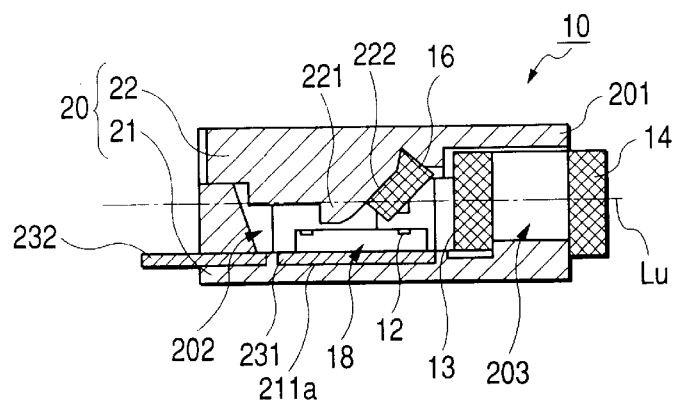
FIG. 3B is a sectional view taken along the line 3B–3B shown in FIG. 3A.
Figure 4:
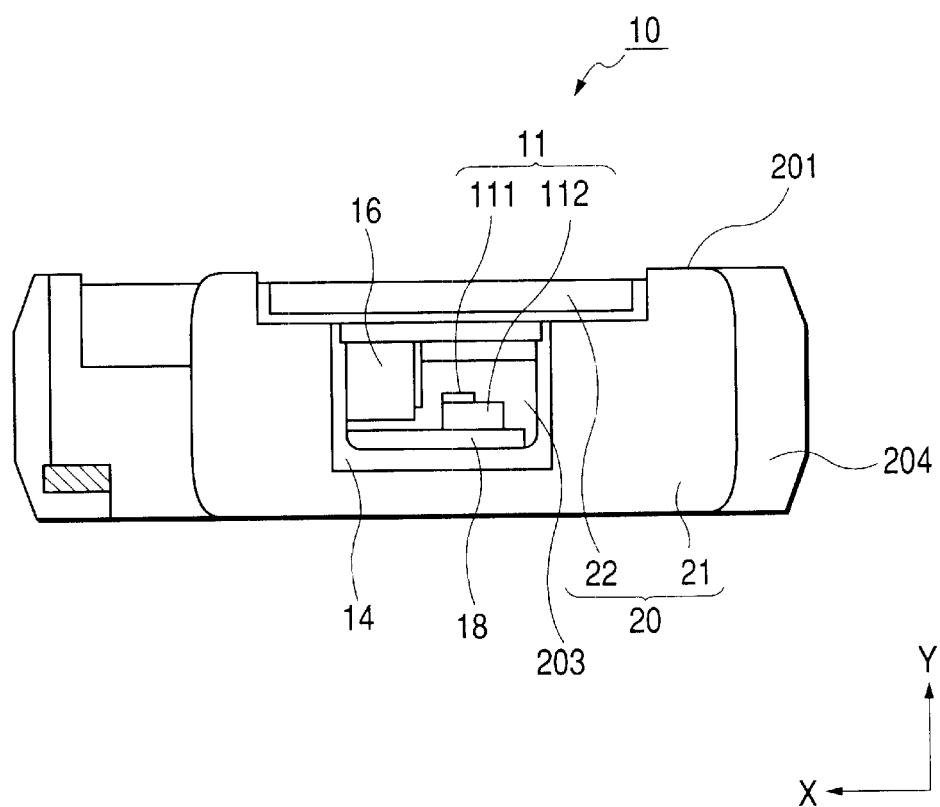
FIG. 4 is a front view of the light source unit shown in FIG. 3.

FIG. 3A is a plan view when a cover of the light source unit is taken off, FIG. 3B and FIG. 3C are respectively sectional views taken along the line 3B—3B in FIG. 3A, and taken along the line 3C—3C in FIG. 3A. FIG. 4 is a front view of the light source unit 10. Incidentally, for easy understanding of the internal structure of the light source unit 10 in FIG. 4, the diffraction gratings 13 and 14 are omitted.

As shown by these views, the package 20 of the light source unit 10 is the flat rectangular parallelepiped shape, and is composed of a box-shaped main body 21 upper portion of which is opened, and a cover plate 22 for closing the opened portion. Inside the package 20, a chamber 202 in which the laser light source 11 or the like is mounted, is partitioned and formed.

Figure 5C:
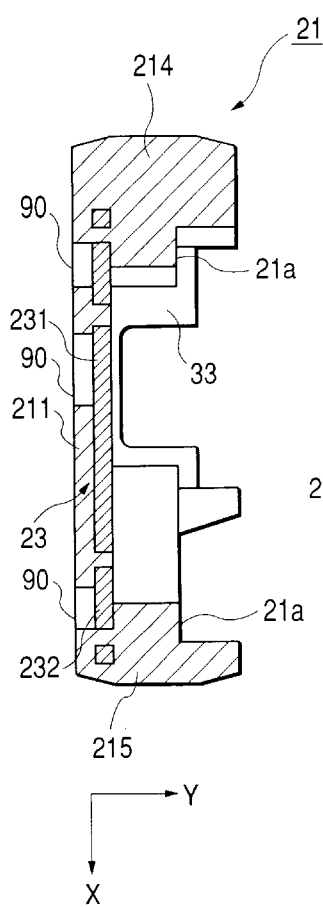
FIG. 5C is a sectional view taken along the line 5C–5C in FIG. 5A.
Figure 5A:
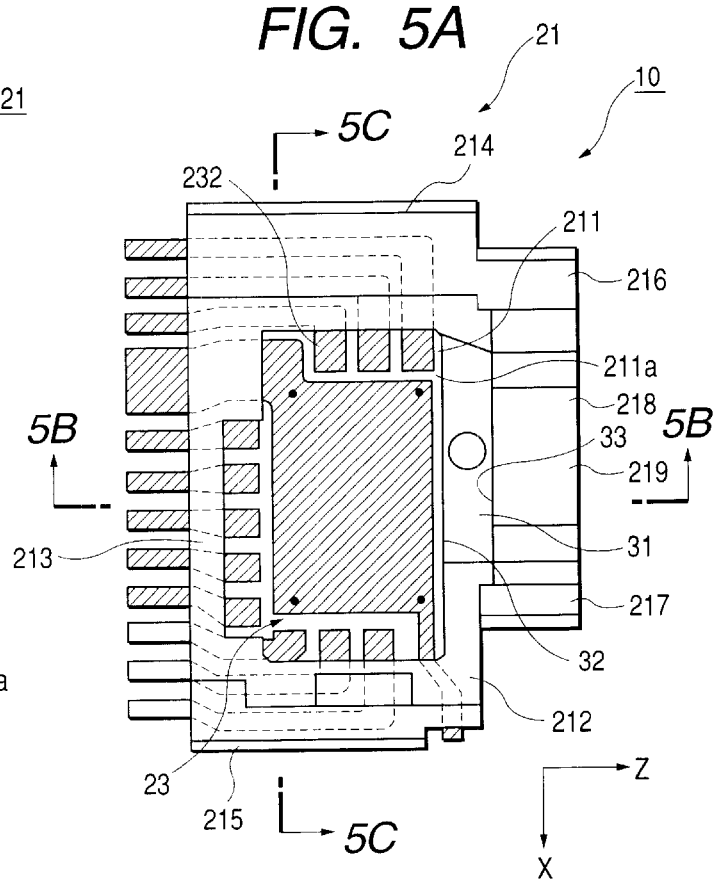
FIG. 5A is a plan view of a main body which is a component of the package of the light source unit.
Figure 5B:
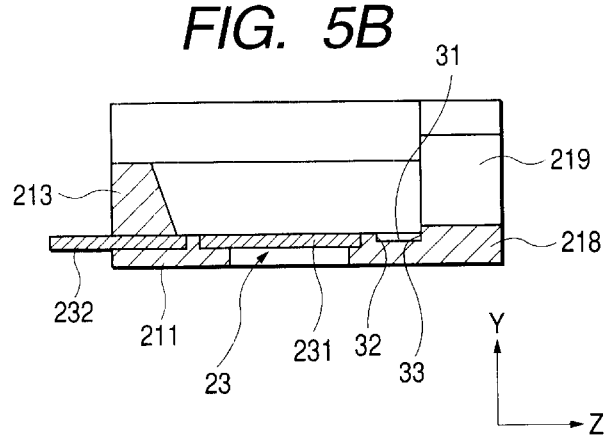
FIG. 5B is a sectional view taken along the line 5B–5B in FIG. 5A.

FIG. 5A is a plan view of the main body 21, FIG. 5B and FIG. 5C are respectively sectional views taken along the line 5B—5B in FIG. 5A, and taken along the line 5C—5C in FIG. 5A. As shown in these views, the main body 21 is provided with an almost rectangular base wall 211, and a front wall 212, a rear wall 213, and left and right side walls 214 and 215 extending from four sides of the base wall 211. A portion of the front wall 212 is notched, and a pair of the left and right protrusion side walls 216 and 217 extend from both sides of the notch perpendicularly to the front wall 212. The lower end portions of these protrusion side walls 216 and 217 are interconnected by a protrusion base wall 218 extending forward from the base wall 211. A protruded portion 219 protruding forward is constructed by these protrusion side walls 216 and 217, and the protrusion base wall 218.

The surface of the base wall 211 of the main body 21 is flat, and is made a reference surface 211a to regulate the positions of the semiconductor laser 11, the submount 112 and the semiconductor substrate 18. Onto this reference surface 211a, a rectangular plate shape stage 231 in a lead frame 23 is fixed. In the present embodiment in the lead frame 23, pad portions of twelve leads 232 position on the reference surface 211a, and portions which are external connection terminals, penetrate the rear wall 213 of the main body 21 and extend to the outside.

Further, as shown in FIG. 5C, in the light source unit 10, a plurality of radiation openings 90 are formed on a side of the base wall 211 on which the semiconductor laser 11 is arranged so that a portion of external connection terminals are exposed therefrom,. Therefore, the light source unit 10 can radiate the heat generation at the time of operations of the semiconductor laser 11, and the signal processor, or the like, inside the package 20 through these radiation openings 90 to the outside.

As shown in FIG. 3B, the protruded portion 201 which is protruded forward, is formed in the front surface of the package 20. In this protruded portion 201, a light passing aperture 203 having a rectangular cross section is formed to emit the laser light to the outside of the package and to introduce the returning light beam from the optical disk 2 into the package inside therethrough.

The 3-beam generating diffractor 13 is attached to the rear end of the light passing aperture 203, and the separating diffractor 14 is attached to the front end of the light passing aperture 203.

The main body 21 is a resin molding product in which the lead frame 23 is inserted and molded. The lead frame 23 is provided with a rectangular plate shaped stage portion 231 and twelve leads 232 protruding to the rear side of the main body 21.

The surface of the base wall 211 of the main body 21 is flat, and is the reference surface 211a to regulate the position of the laser light source 11. A stage portion 231 is laminated and arranged on the reference surface 211a. Each lead 232 protrudes rearward from the rear wall 213 of the cover plate 21. The pad portions of these leads 232 are portions to be wire-bonded to the electrode portions formed on the semiconductor substrate.

Figure 6:
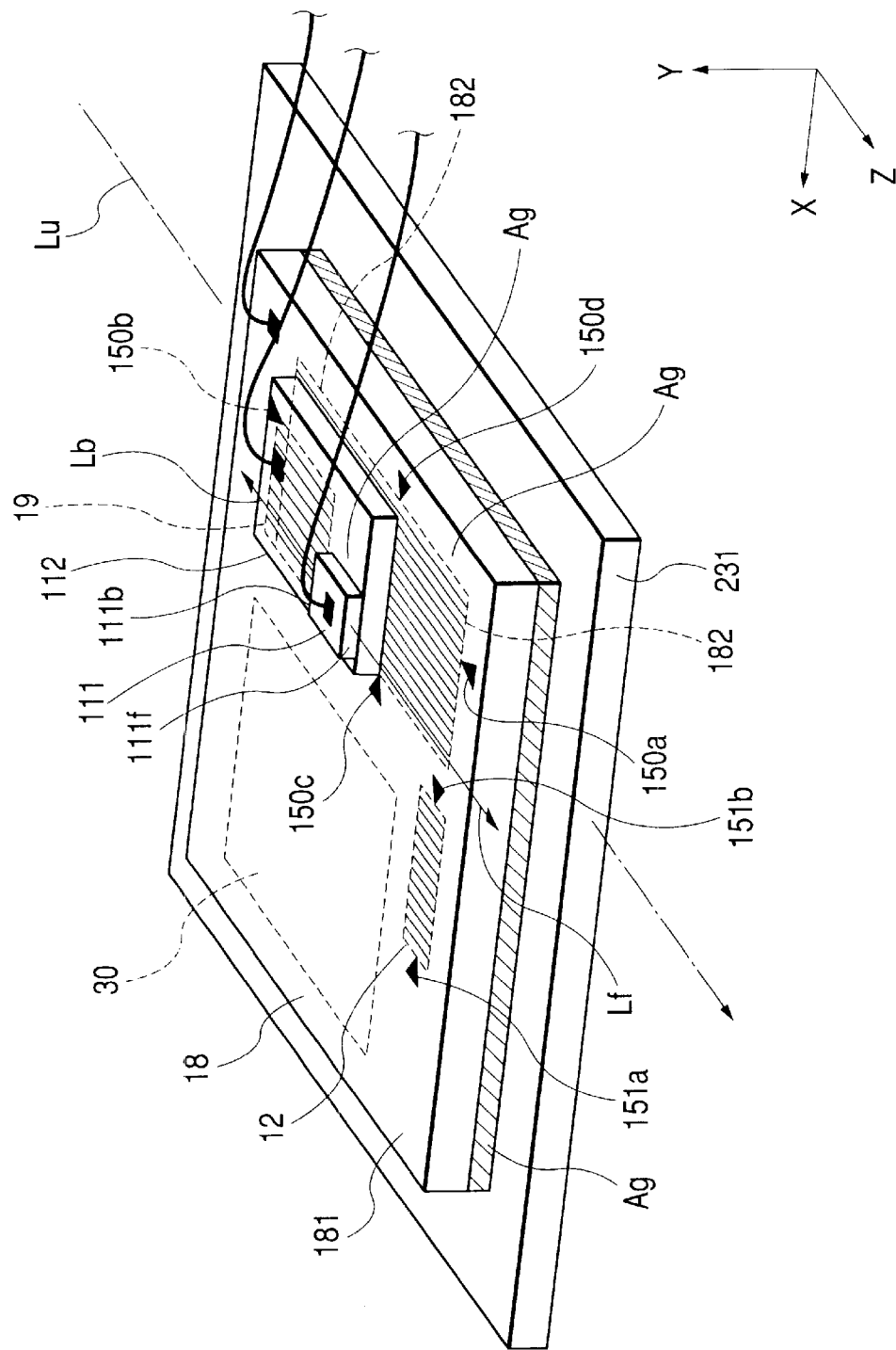
FIG. 6 is an enlarged perspective view showing a semiconductor substrate and its peripheral portion in the light source unit.
Figure 7:
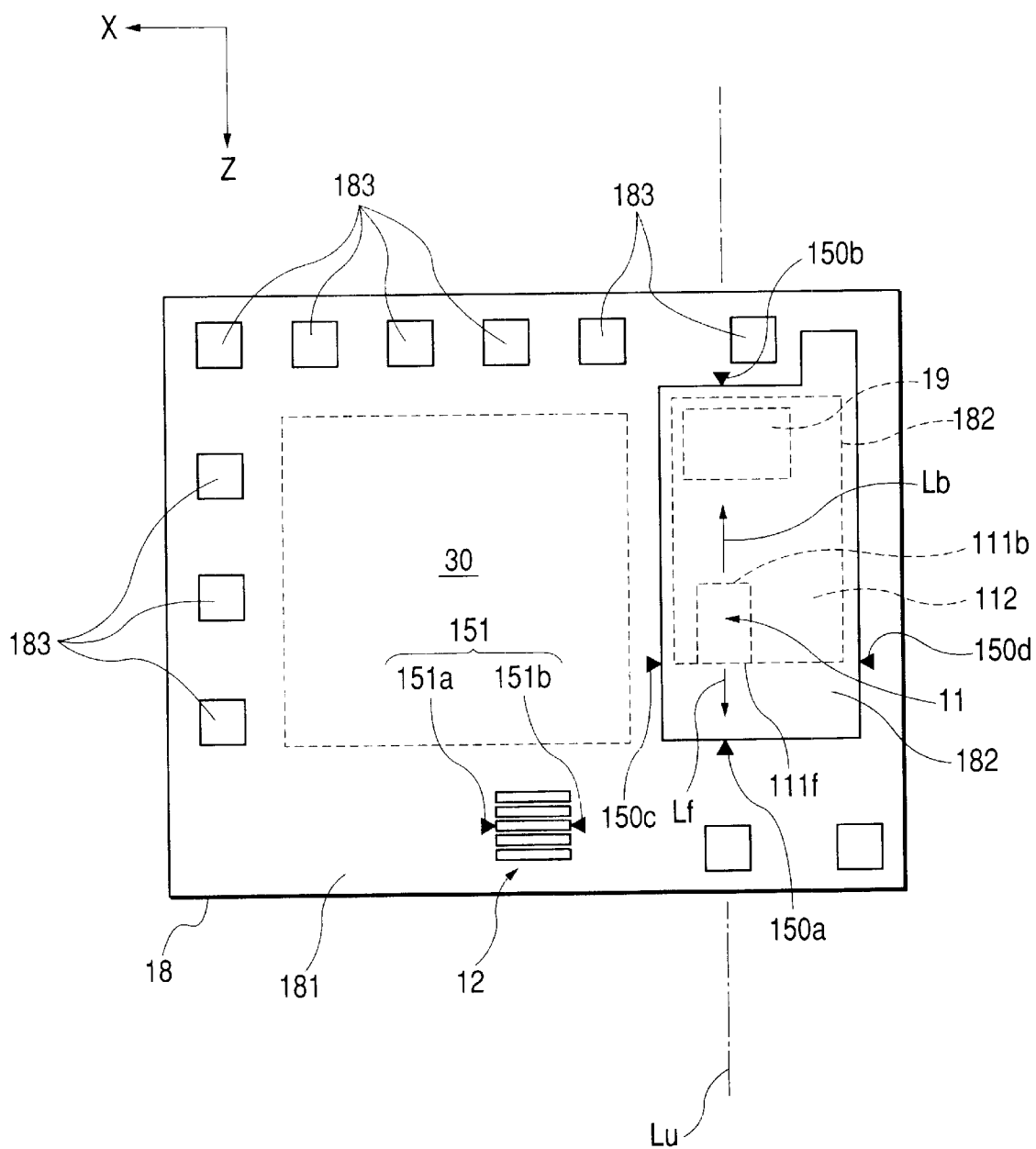
FIG. 7 is an enlarged plan view showing a substrate surface of the semiconductor substrate of FIG. 6.

FIG. 6 is an enlarged perspective view showing the semiconductor substrate and a peripheral portion thereof, and FIG. 7 is a plan view showing the substrate surface of the semiconductor substrate. When description is conducted referring to FIG. 3 and these FIGS. 6 and 7, the semiconductor substrate 18 is bonded by silver pasting Ag on the stage portion 231 of the lead frame 23. In a top surface 181 of the semiconductor substrate 18, a rectangular-shaped electrode portion 182 extending in a front-rear direction of the light source unit is formed. A signal processor 30 is also formed on the top surface 181 next to the electrode portion 182. The laser light source 11 is mounted on the electrode portion 182.

The laser light source 111 is provided with the semiconductor laser chip 111 and the submount 112. The submount is a semiconductor substrate having the constant thickness, and fixed on the electrode portion 182 by silver pasting Ag. The semiconductor laser chip 111 is fixed on the surface of the submount 112 by silver pasting Ag.

The semiconductor laser chip 111 is provided with a front emission surface 111f to emit the laser light Lf forward, and a rear emission surface 111b to emit the laser light Lb backward. Each laser light Lf and Lb are emitted from these end surfaces 111f and 111b along the parallel direction to the top surface 181 of the semiconductor substrate 18. The light emitting point of the front laser light Lf of the semiconductor laser chip 111 situates at almost center on the front emission surface 111f in the height direction of the package 20, and the front laser light Lf emitted from this point passes through respective diffractors 13 and 14, which are attached to the light passing aperture 203, and is emitted to the outside.

On the top surface 181 of the semiconductor substrate 18, the signal processor 30 formed next to the electrode portion 182, is a circuit which enhances the level of the output signal of the photo detector 12, and generates a pit signal (RF signal), a tracking error signal (TE signal), and a focus error signal (FE signal). The photo detector 12 is formed in the front of the signal processor 30. That is, the photo detector 12 and the signal processor 30 are made on the same semiconductor substrate 18.

A monitor photo detector 19 to feedback-control the laser light output of the semiconductor laser chip 111 is formed on the surface of the submount 112 on the rear side of the semiconductor laser chip 111. A portion of the back laser light Lb from the semiconductor laser chip 111 directly enters into this monitor photo detector 19.

Herein, in the light source unit 10, the optical length of the semiconductor laser 11 and the separating diffractor 14, and the optical length from the separating diffractor 14 to the photo detector 12 through the reflection mirror 16, are set to become equal. Accordingly, in the present embodiment, the accuracy of the relative positions of the semiconductor laser 11 and the photo detector 12 is enhanced as follows.

As shown in FIG. 7, a plurality of triangular positioning marks 150 showing a mounting position of the semiconductor laser 11 are provided on the top-surface 181 of the semiconductor substrate 18. Each mark 150 is formed on the outside of the electrode portion 182. In the present embodiment, two marks 150a and 150b showing positions in the optical axis direction in the semiconductor laser 11, and two marks 150c and 150d showing positions in the direction perpendicular to the optical axis, are formed.

Accordingly, when these marks 150a–150d are used as indicators, and the semiconductor laser 11 is mounted on the submount 112, the relative positions of the semiconductor laser 11 and the photo detector 12 can be accurately regulated. That is, when the semiconductor laser 11 is mounted on the submount 112, the semiconductor laser 11 is mounted on the submount 112 so that the light emitting point of the semiconductor laser 11 coincides with an intersecting point of two lines connecting corresponding marks 150. According to this, relative positioning of the semiconductor laser 11 and the photo detector 12 can be attained. Accordingly, the semiconductor laser 11 can be arranged at an accurate optical position to the photo detector 12.

Herein, in the present embodiment, each mark 150, including marks 151 and 152, which will be described later, is formed of film-like resin. Further, when these marks 150, 151 and 152 are formed, these marks are simultaneously formed at the exposure process by which the optical detecting element 12 is made on the top surface 181 of the semiconductor substrate 18. That is, the exposure apparatus used for making the photo detector 12 is used as it is. Accordingly, the pattern member for forming the photo detector 12 and the pattern member for forming the marks 150, 151, and 152 can be accurately formed at desired positions to the semiconductor substrate 18. Accordingly, the accuracy of the mark forming position can be increased.

Further, as shown in FIG. 3, a mirror attaching portion 221 is integrally formed on the cover plate 22. The mirror attaching portion 221 is a protrusion having a trapezoidal cross section, which is formed almost just above the photo detector 12 and protrudes to the lower side. The front of the trapezoidal cross sectional mirror attaching portion 221 is a mirror attaching surface 222 which is slanted by 45° toward the front side, and the reflector 16 is fixed thereon by adhesive agents.

The returning light beam Lr from the optical disk 2 which enters into the package through respective diffractors 13 and 14 comes to the reflector 16, and falls downward perpendicularly by this reflector 16 and irradiates the photo detector 12.

The 3-beam Generating Diffractor

Figure 8A:
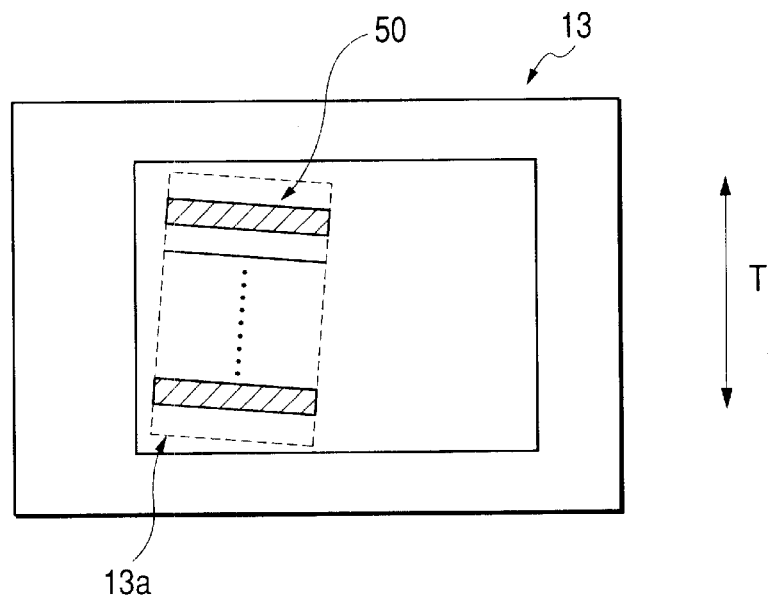
FIG. 8A is a plan view of a 3-beam generating diffractor.
Figure 8B:
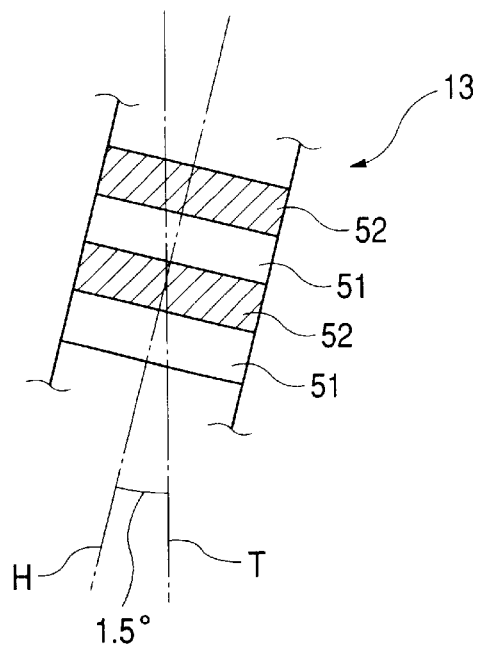
FIG. 8B is an enlarged view showing a portion of a diffraction grating pattern thereof.

FIG. 8A is a plan view of the 3-beam generating diffractor 13, and FIG. 8B is an enlarged view showing a portion of the diffraction grating pattern of the diffractor 13. As shown in these views, on a left half surface of the 3-beam generating diffractor 13, an effective area 13a to diffract the laser light Lf is formed, and a diffraction grating pattern 50 is formed therein.

Figure 9:
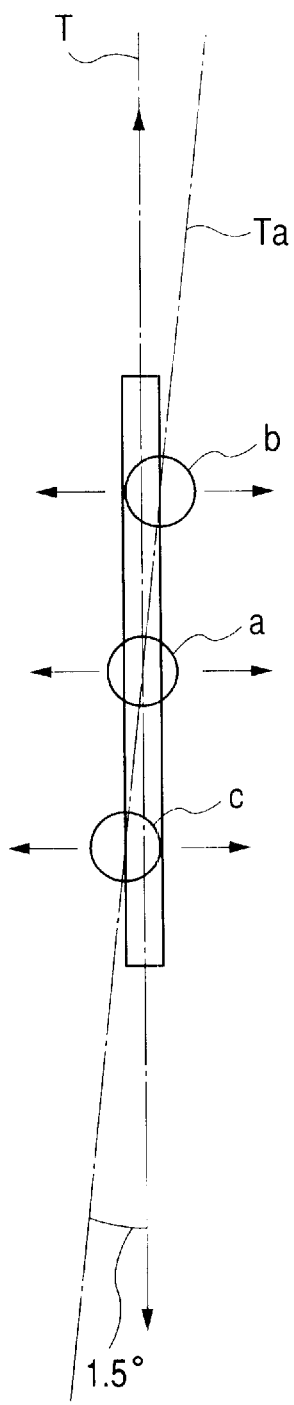
FIG. 9 is a schematic diagram showing an arrangement of light spots formed on a track of an optical disk.

As shown in FIG. 8B, the diffraction grating 50 is one in which a linear transparent portion (first lattice) 51 and a linear opaque portion (second lattice) 52 are alternately arranged. The arrangement direction H of the transparent portion 51 and the opaque portion 52 is slanted by about 1.5° to the track direction T. Accordingly, as shown in FIG. 9, a line segment in which the centers of the three light spots a, b, and c, formed on the track of the optical disk 2, are connected, is slanted by about 1.5° to the track direction T.

Generally, the light source unit 10 and each optical element mounted therein are positioned according to the reference surface corresponding to the track direction of the optical disk, and the reference surface corresponding to the direction perpendicular to the track direction. In the present embodiment, when the light source unit 10 is attached according to these reference surfaces, the lattice of the 3-beam generating diffraction grating 13 mounted there is automatically in the situation that the lattice is slanted by 1.5° to the track direction according to the positioning marks 152 described later. Therefore, the adjusting operation by which the light source unit 10 is rotated around the optical axis, or the similar operation, is not necessary, and as shown in FIG. 9, three light spots a, b, and c can be formed to the track Ta of the optical disc 2.

Further, the transparent portions 51 and the opaque portions 52 are provided in the irregular interval, and has a function to divide the laser light Lf into the main beam and two subsidiary beams. Further, it has a function in which the wave surfaces of two subsidiary beams are converted so that two subsidiary beams are focused on the front and the rear in the optical axis direction at the optical disk 2. This diffraction pattern 50 is formed at a biased position to the one half side of the effective area 13a so that the returning light beam pass through the other half side of the diffractor 13.

The laser light Lf entered such the 3-beam generating diffractor 13, is divided into the main beam and two subsidiary beams by the 3-beam generating diffractor 13. In these beams, the two subsidiary beams are used as the laser beams for the tracking error detection, and for focusing error detection. Further, the main beam is used as the laser beam for the signal reproduction. In addition to that, the main beam is used as the laser beam for detecting the deviation amount of the objective lens 4.

Separating Diffractor

The diffraction grating 14 is set such that the product of the zero-order diffraction efficiency in the optical path through which the 3-beam reaches the optical disk, and the first-order diffraction efficiency in the optical path through which the returning light beam of the three beams reflected by the optical disk 2 reaches the photo detector 12, becomes maximum.

The light component passed through the separating diffractor 14 in the three beams, is emitted from the light source unit 10, and after being deflected at right angles on the reflection mirror 15, it is converged onto the track Ta of the optical disk 2 through the objective lens 4, as shown in FIG. 9. In this case, the main beam focuses on the track, and two subsidiary beams are to be the front-focus and the rear-focus, respectively.

The three beams converged onto the track Ta of the optical disk 2 are reflected thereon, and become the returning light beam Lr advancing toward the photo detector 12. These returning light beam Lr enter again into the separating diffractor 14 of the light source unit 10 through the objective lens 4 and the reflection mirror 15.

Figure 10A:
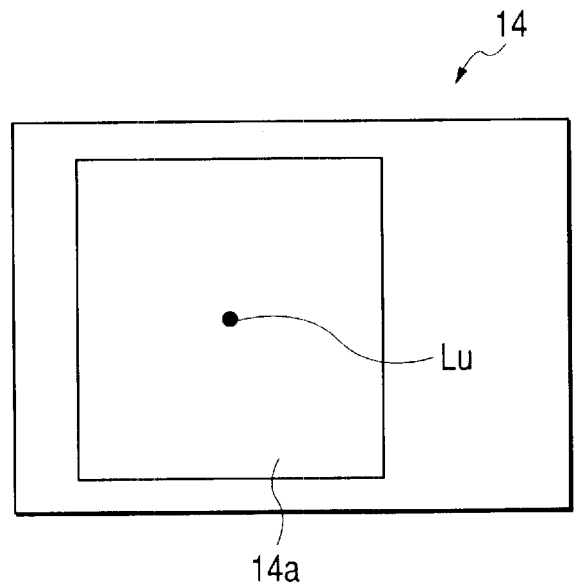
FIG. 10A is a plan view of a separating diffractor.
Figure 10B:
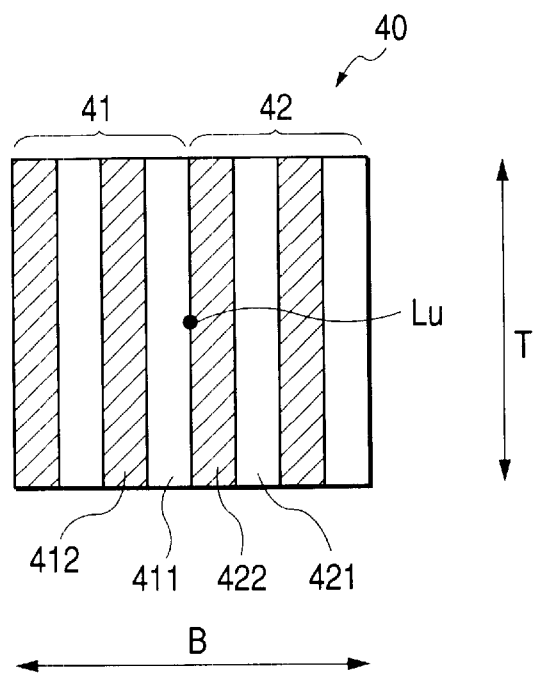
FIG. 10B is an enlarged view showing a portion of a diffraction grating pattern thereof.

FIG. 10A is a plan view of the separating diffractor 14, and FIG. 10B is an enlarged plan view of the diffraction grating pattern of the separating diffractor 14. On the left side of a surface of the separating diffractor 14, an effective area 14a to diffract the incident light is formed. Into this area 14a, three returning light beams Lr are entered, and the returning light beam Lr is diffracted by the diffraction grating pattern 40 formed therein.

The diffraction grating pattern 40 has two diffraction areas 41 and 42 in which the diffraction characteristic is different from each other. These diffraction areas 41 and 42 are arranged at the left and right with the optical axis Lu as the boundary between them. In the diffraction area 41, the transparent portion 411 and the opaque portion 412 are changed periodically, in the width direction of the package 20 corresponding to the direction B perpendicular to the track direction T. On the one hand, in the same manner as in the diffraction area 41, also in the diffraction area 42, the transparent portion 421 and the opaque portion 422 are alternately formed in the width direction B of the package 20.

When it will be described in detail, in the first diffraction area 41, the transparent portion 411 and the opaque portion 412 are repeated in this order from the optical axis Lu to the left. Further, in the second diffraction area 42, the opaque portion 422 and the transparent portion 421 are repeated in this order from the optical axis Lu to the right. The widths of the transparent portion 411 and the opaque portion 412 in the first diffraction area 41 are respectively formed wider than those of the transparent portion 421 and the opaque portion 422.

In the three returning light beams Lr entered the effective area 14a of the separating diffractor 14, their optical paths are respectively deflected to the width direction of the package 20 toward the reflector 16 by the diffraction action of the diffraction areas 41 and 42. Thereby, the laser light Lf from the semiconductor laser chip 111 and the returning light beam Lr from the disk 2 are separated. Accordingly, the three returning light beams Lr from the optical disk 2 are divided into two around the optical axis to the direction B perpendicular to the track direction T of the optical disc 2, and respective returning light beam is divided into the first and the second divided light. As the result, six returning light beams advance to the reflector 16.

Incidentally, respective diffraction areas 41 and 42 have not a function of wave surface conversion such as convergence and divergence of each returning light beam.

The six returning light beams advancing from the separating diffractor 14 to the reflector 16 enter into the 3-beam generating diffractor 13 on the way advancing to the reflector 16. As described above, the effective area 13a of the 3-beam generating diffractor 13 is not formed at an area into which these returning light beams enter. Accordingly, the six returning light beams entered the diffractor 13 pass through the diffractor 13 and reach the reflector 16. These returning light beams fall downward perpendicularly at the reflector 16, and irradiate each receiving surface of the photo detector 12.

Photo Detector

Figure 11:
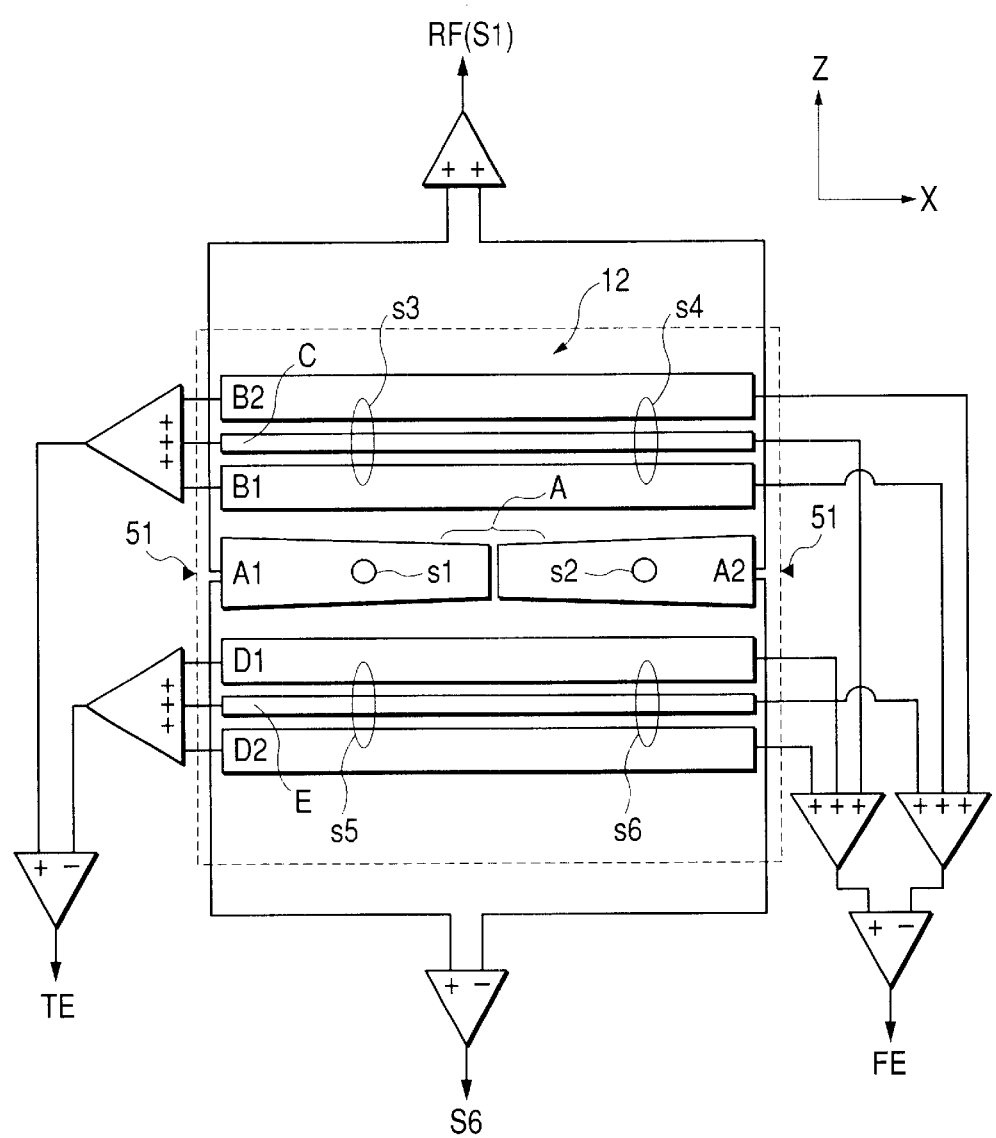
FIG. 11 is an enlarged plan view showing a light receiving element of the light source unit.

As shown in FIG. 11, the photo detector 12 has strip-like light receiving cells A1 and A2. These light receiving cells A1 and A2 are arranged in the width direction of the package 20. These light receiving cells A1 and A2 are formed into the trapezoidal shape,. the width of which is narrowed toward the center of the photo detector 12.

In the rear of these light receiving cells A1 and A2, a light receiving cell B1, a light receiving cell C, and a light receiving cell B2 are arranged in this order, and in the front of these light receiving cells A1 and A2, a light receiving cell D1, a light receiving cell E, and a light receiving cell D2 are arranged in this order. The light receiving cell A is one for the pit signal (RF signal) detection, and remaining light receiving cells are ones for the tracking error signal (TE signal) detection, and the focus error signal (FE signal) detection. The length in the width direction in the package 20 of the light receiving cells B1, B2, C, D1, D2, and E is almost equal to the length in which the lengths of the light receiving cells A1 and A2 are added. Accordingly, in the photo detector 12, the light receiving cell A positioned at the center, is in the situation that only the light receiving cell A is divided into two members in the width direction of the package 20.

In the six returning light beams which fall toward the photo detector 12 by the reflector 16, two divided light beams corresponding to the returning light beam of the main beam form light spots S1 and S2 on the light receiving cells A1 and A2. Further, the two divided light beans corresponding to the returning light beam of one subsidiary beam form light spots S3 and S4 on the light receiving cells B1, B2 and C. The two divided light beans corresponding to the returning light beam of the other subsidiary beam form light spots S5 and S6 on the light receiving cells D1, D2 and E.

In the present embodiment, the RF signal is formed according to the received illuminance of the light receiving cells A1 and A2. Further, when the difference between the received illuminance of the light receiving cell A1 and the received illuminance of the light receiving cell A2 is found, the detection signal of a movement amount of the objective lens 12 is also formed. Further, when the difference between the sum total of the received illuminances of the light receiving cells B1, B2, C and the sum total of the received illuminances of the light receiving cells D1, D2, E is found, the TE signal is generated. Further, when the difference between the sum total of the received illuminances of the light receiving cells B1, B2, E and the sum total of the received illuminances of the light receiving cells D1, D2, C is found, the FE signal is generated. Incidentally, these signals are generated in the controller (not shown) which is electrically connected to the external connection terminal 232 of the lead frame 23 of the light source unit 10.

Signal Processor

Figure 12A:
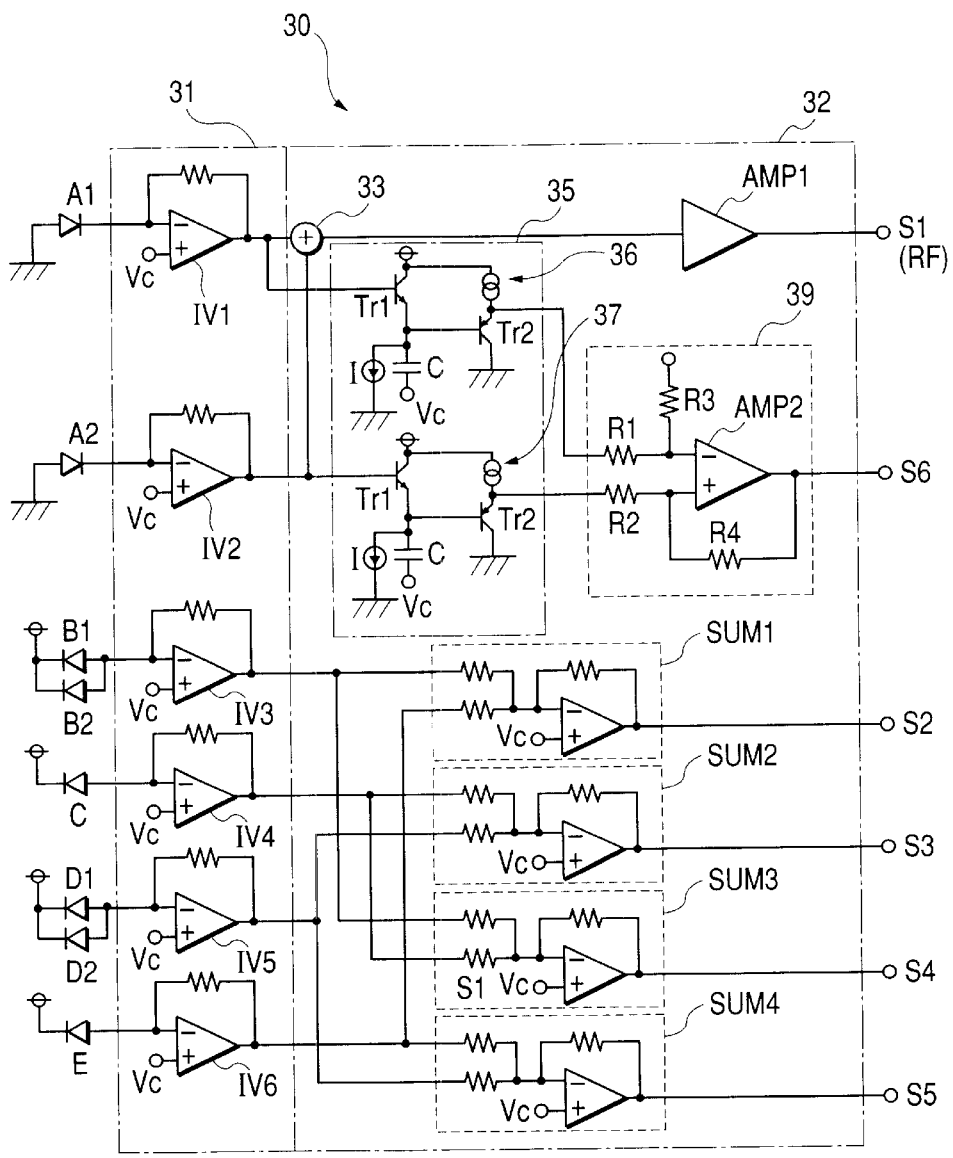
FIGS. 12A to 12C are circuit diagrams of a signal processor of the light pick-up device.

FIG. 12A is a circuit diagram showing a detailed configuration of the signal processor 30 for the signal from the light receiving cell. The signal processor 30 comprises an I/V amplifier section 31 by which the electrical signals supplied from each light receiving cell are being amplified, and converted into voltage corresponding to the received illuminances on each light receiving cell. In the I/V amplifier section 31, the electric signal supplied from the light receiving cell A1 is converted into a voltage signal by an inverter IV1, and the electric signal supplied from the light receiving cell A2 is converted into a voltage signal by an inverter IV2. Further, the electric signal supplied from the light receiving cell C is converted into a voltage signal by an inverter IV4, and the electric signal supplied from the light receiving cell E is converted into a voltage signal by an inverter IV6.

Herein, in the I/V amplifier section 31, the electric signal corresponding to the sum total of the received illuminances in the light receiving cells B1 and B2, and the electric signal corresponding to the sum total of the received illuminances in the light receiving cells D1 and D2 are supplied. In the I/V amplifier section 31, the former electric signal is converted into the voltage signal by the inverter IV3, and the latter electric signal is converted into the voltage signal by the inverter IV5. Incidentally, each of the inverters IV1–IV6 is structured by a resistor and an operational amplifier.

The voltage signals converted by respective inverters IV1–IV6 are supplied to the operation circuit section 32. In the operation circuit section 32, the voltage signals outputted from the inverters IV1 and IV2 are added by an adder 33. The result of the addition by the adder is amplified by a signal regeneration amplifier AMP1, and becomes the voltage signal S1.

Further, in the operation circuit section 32, the voltage signal outputted from the inverter IV3 and the voltage signal outputted from the inverter IV6 are added by an addition circuit SUM1. As the result, the voltage signal S2 is generated according to the sum total of the received illuminances of the light receiving cells B1, B2 and E. Further, in the operation circuit section 32, the voltage signal outputted from the inverter IV4 and the voltage signal outputted from the inverter IV5 are added by an addition circuit SUM2. As the result, the voltage signal S3 is generated according to the sum total of the received illuminances of the light receiving cells D1, D2 and C.

Further, in the operation circuit section 32, the voltage signal outputted from the inverter IV3 and the voltage signal outputted from the inverter IV4 are added by an addition circuit SUM 3. As the result, a voltage signal S4 according to the sum total of the received illuminances of the light receiving cells B1, B2 and C is generated. Further, in the operation circuit section 32, the voltage signal outputted from the inverter IV5 and the voltage signal outputted from the inverter IV6 are added by an addition circuit SUM 4. As the result, a voltage signal S5 according to the sum total of the received illuminances of the light receiving cells D1, D2 and E is generated.

Incidentally, each of addition circuits SUM 1–SUM 4 is structured by three resistors and one operational amplifier.

Herein, the operation circuit section 32 has the inverter IV1, and the peak hold circuit 35 to hold the peak value of the voltage signal from the inverter IV2. This peak hold circuit 35 is provided with the first peak hold circuit 36 to hold the peak value of the voltage signal from the inverter IV1, and the second peak hold circuit 37 to hold the peak value of the voltage signal from the inverter IV2. Each of peak hold circuits 36 and 37 is the same circuit configuration, and is structured by electric and electronic elements such as transistors Tr1, Tr2, a capacitor C1, and a current source I. The peak value of each voltage signal outputted from each of peak hold circuits 36 and 37 is supplied to a lens deviation detecting circuit 39.

The lens deviation detecting circuit 39 is a subtraction circuit structured by resistors R1–R4 and an operational amplifier AMP 2. The peak value of each voltage signal is subtracted by this circuit 39 and becomes a voltage signal S6 showing the difference of each peak value.

Each electrode portion 183 formed on the top surface 181 of the semiconductor substrate 18 is electrically connected to the pad portion of the corresponding lead 232 (refer to FIG. 3) by wire bonding. Each of voltage signals S1–S6 is guided to the controller provided outside through a predetermined lead L. In the controller, each kind of signals are generated based on each of voltage signals S1–S6.

Figure 12B:
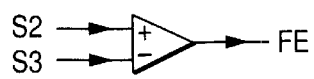
Figure 12C:
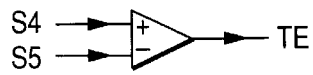

In the present embodiment, the RF signal is generated from the voltage signal S1, and as shown in FIG. 12B, the difference between the voltage signal S2 and the voltage signal S3 is found, thereby, the FE signal is generated. Further, as shown in FIG. 12C, the difference between the voltage signal S4 and the voltage signal S5 is found, thereby, the TE signal is generated.

Herein, in the light pick-up device 1 in the present embodiment, when the objective lens 4 is stationary, respective illuminances of divided light beams of the main beam are equal. Accordingly, the received illuminances on the light receiving cells A1 and A2 are almost the same, and the voltage signals corresponding to these received illuminances are cancelled each other in the lens deviation detecting circuit 39, and the output voltage of this circuit becomes substantially zero.

In contrast to that, when the objective lens 4 is deflected from the optical axis due to the oscillation of the lens holder 5b, the illuminances of respective the divided light beams are different. Accordingly, the voltage signals corresponding to the received illuminances on the light receiving cells A1 and A2 are not cancelled each other in the lens deviation detecting circuit 39, and a deflection signal (voltage signal) S6 corresponding to the deviation amount of the objective lens 4 is outputted from this detection circuit 39.

As described above, in the light pick-up device 1, the deflection signal S6 showing the deviation amount of the objective lens 4 can be obtained in the signal processor 30. Accordingly, the objective lens driver 5 is feedback-controlled according to this deflection signal S6, the objective lens 4 can be made to become stationary at the desired position in the radial direction of the optical disk 2 and in the direction along the optical axis. Accordingly, a time period to wait the oscillation attenuation of the objective lens can be shortened, thereby an increase of the speed of the reproduction of the recording information can be intended.

Herein, the illuminance of the returning light beam Lr from the optical disk 2 varies due to the production error of the depth of a plurality of pits (not shown) forming the track Ta, or the shape of the edge of the pit, or the like. Accordingly, in the present light pick-up device 1, the peak hold circuit section 35 is provided in the signal processor 30. This peak hold circuit section 35 holds the peak value of the voltage signal to generate the deflection signal S6. Therefore, the peak value of the voltage held in this peak hold circuit section 35 is subtracted in the lens deviation detecting circuit 39.

Accordingly, even when the voltage signal varies corresponding to the shape of the track Ta, or the like, the variation amount is supplied to the lens deviation detecting circuit 39 and subtracted, thereby, it does not become the deflection signal. Accordingly, the deflection signal S6 to accurately show the deviation amount of the objective lens 4 can be generated.

Attachment Structure of the Reflection Mirror and the Position Adjusting Method

As shown in FIG. 3, a mirror attachment portion 221 is integrally formed on the cover plate 22 which is a component member of the package 20. The mirror attachment portion 221 is a protrusion having a trapezoidal cross section which is formed from about just above of the photo detector 12 toward the rear side. The front surface of the mirror attachment portion 221 is a mirror attachment surface 222 which is slanted by 45° toward the front. The reflection mirror 16 is fixed on the mirror attachment surface 222 by adhesive agent, or the like.

The six returning light beams Lr from the optical disk 2 entering into the package 20 through the 3-beam generating diffractor 13 and the separating diffractor 14 are reflected by downward at right angles by the reflection mirror 16, and irradiate each light receiving cell of the photo detector 12.

Accordingly, when the relative positions of the reflection mirror 16 and the photo detector 12 is not correct, each returning light beam Lr can not be converged onto a predetermined light receiving cell. Accordingly, in the present embodiment, the package cover 22 is slidably attached to the main body 21. A guide face 21a is formed in the main body 21, along which the cover plate 22 is slidable in the optical axis direction of the semiconductor laser chip 111. The cover plate 22 slides in the optical axis direction with respect to the main body 21 while one portion of a lower surface thereof is being guided by the guide face 21a. As the cover plate 22 moves, the position of the reflection mirror 16 attached thereto also moves in the optical axis direction.

Herein, as shown in FIG. 7, marks 151 (151a, 151b) are provided on the top face 181 of the semiconductor substrate 18 in the vicinity of the photo detector formed therein in order to specify the relative position with respect to the laser light source 11. These triangle marks 151 are formed on the both ends of the photo detector 12 such that these are perpendicular to the optical axis direction Lu in the package 20. The relative positions of the reflection mirror 16 and the photo detector 12 are adjusted by using these marks 151 as indicators.

Figure 13:
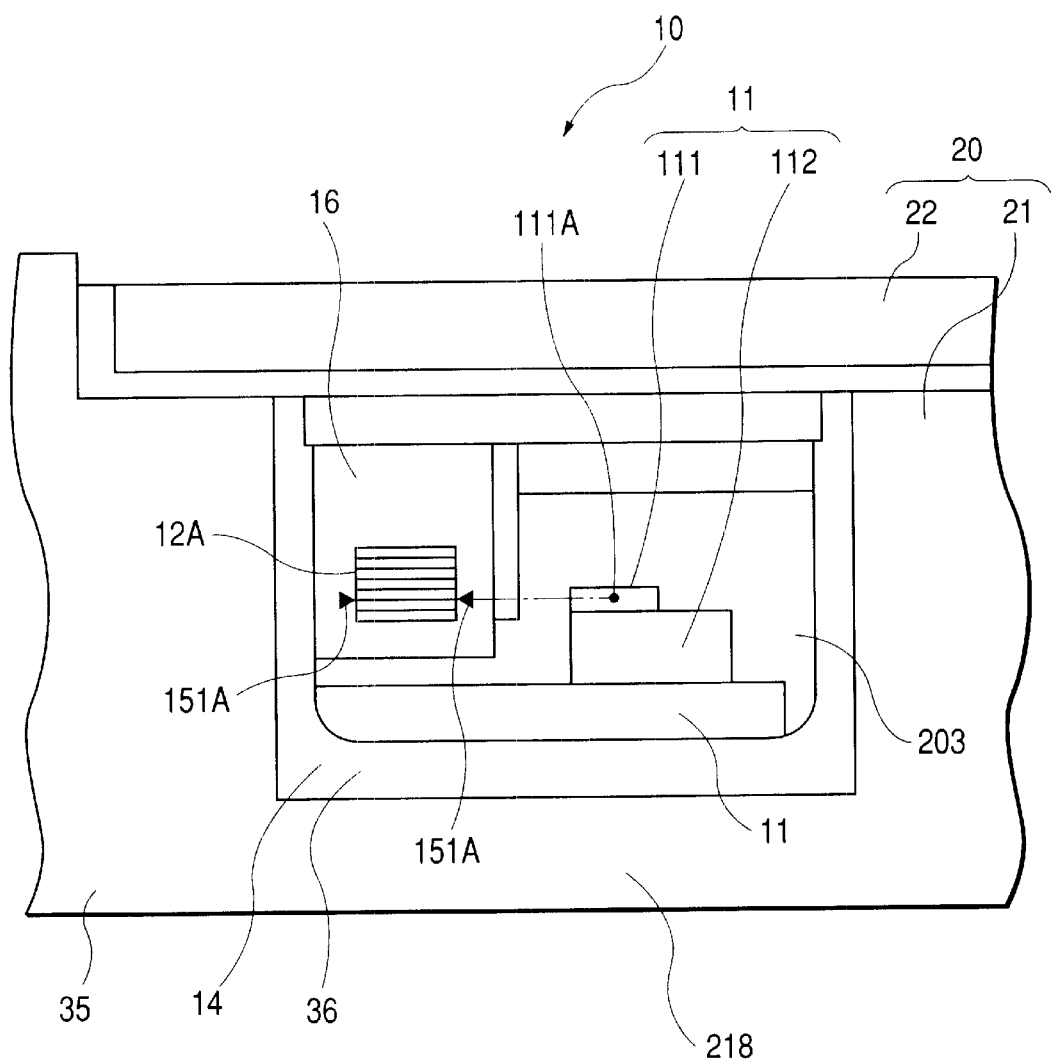
FIG. 13 is an enlarged schematic view showing that the light receiving element is reflected in the reflection mirror in the light source unit shown in FIG. 4.

Next, the adjusting operation of the relative positions of the photo detector 12 and the reflection mirror 16 will be described according to FIG. 13. FIG. 13 is a view in which the inside of the package of the light source unit 20 is viewed from the outside through the light passing aperture 203. As described above, in the present embodiment, the reflection mirror 16 can be faced from the outside through the light passing aperture 203.

Initially, viewing the inside of the package from the light passing aperture 203 to observe the photo detector 12A reflected in the reflection mirror 16. Then turning on the semiconductor laser chip 111. Next, sliding the cover plate 22 with respect to the main body 21 such that the mark 151A, formed in the vicinity of the photo detector 12 reflected in the reflection mirror 16, and the light emission point 111A of the semiconductor laser chip 111 have the same height. According to this, the position of the reflection mirror 16 is adjusted in the optical axis direction, and the relative positions of the photo detector 12 and the reflection mirror 16 are automatically regulated to a predetermined relationship. As the result, the returning light beam Lr from the optical disk 2 can be guided to an appropriate position of the photo detector 12. Incidentally, in this condition, the cover plate 22 and the main body 21 are fixed to each other through the fixing means such as adhesive agents.

Figure 14:
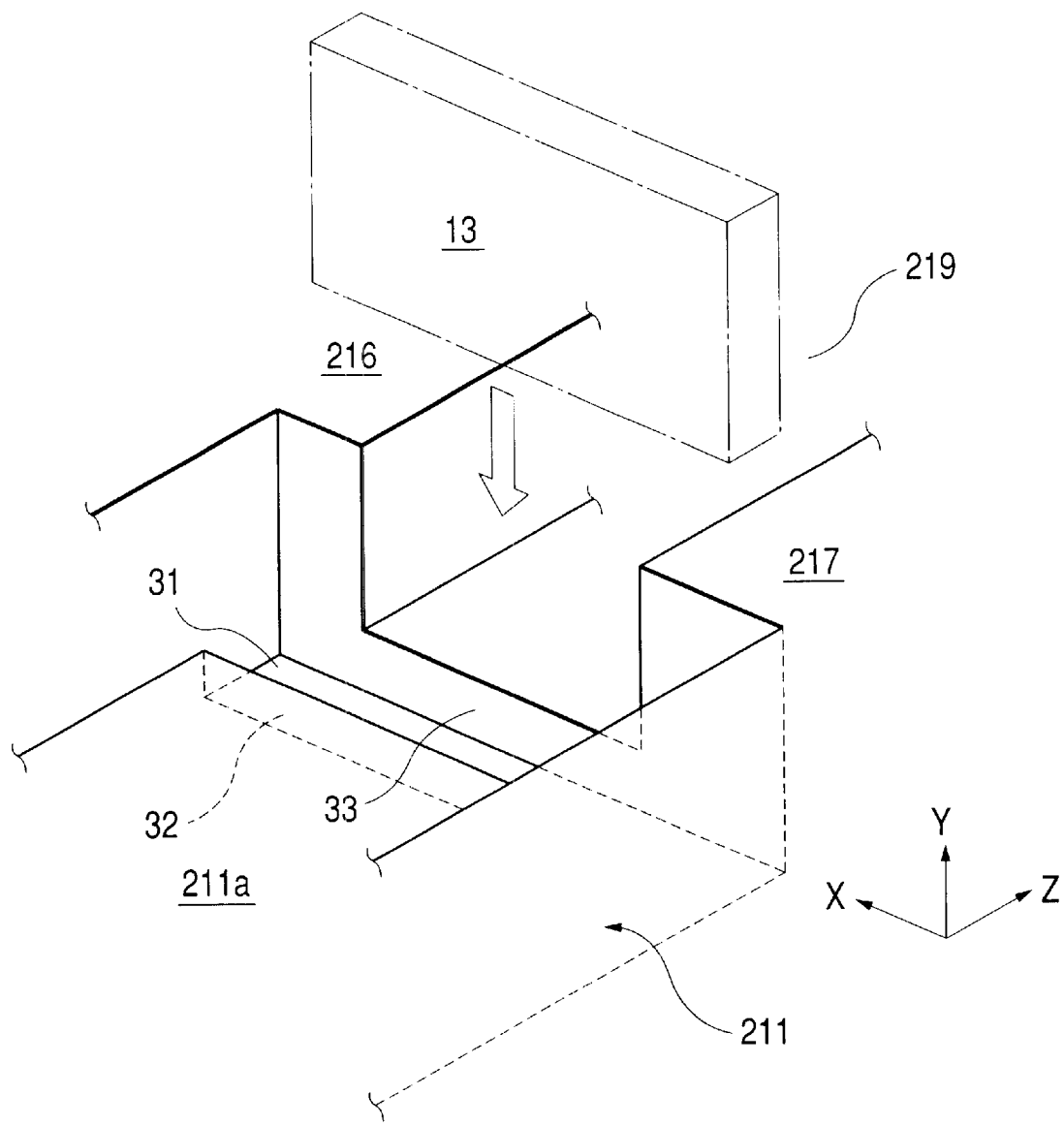
FIG. 14 is a view for explaining the attachment structure of the 3-beam generating diffractor of the light source unit.
Figure 15:
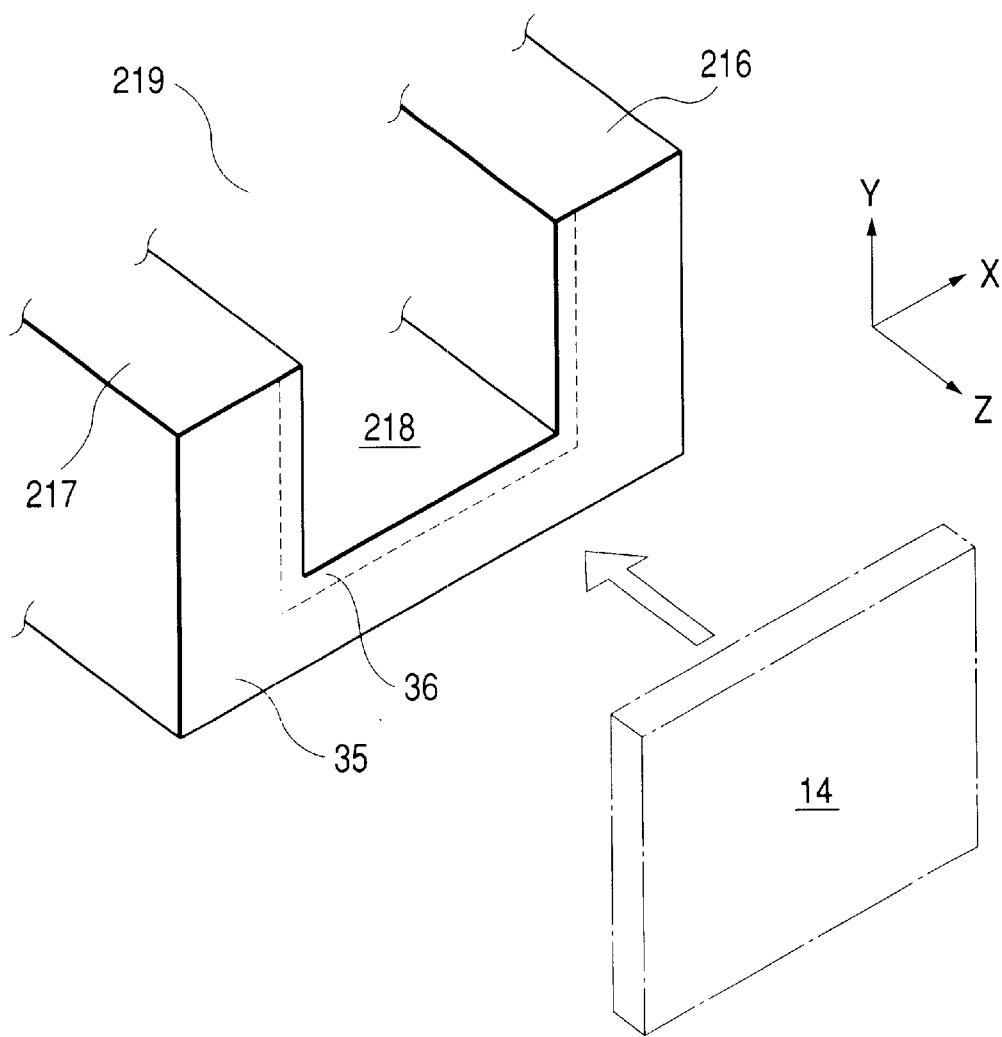
FIG. 15 is a view for explaining the attachment structure of the separating diffractor of the light source unit.

Attachment Structure and the Adjustment Direction of the 3-beam Generating Diffractor In FIG. 14, the attachment structure of the 3-beam generating diffractor 13 is schematically shown. In FIG. 15, the attachment structure of the separating diffractor 14 is schematically shown. As shown in FIGS. 5 and 14, a recessed portion 31, which is lower than the reference surface 211a, is formed on the guide face 21a of the main body 21 so as to extend in the width direction of the package 20. The dimension thereof in the longitudinal direction of the package 20 is substantially the same as the thickness of the 3-beam generating diffractor 13. A step wall 32 defines a boundary between the reference face 211a and the recessed portion 31, and a step wall 33 defines a boundary between the recessed portion 31 and the protruded portion 216.

Accordingly, when the 3-beam generating diffractor 13 is inserted into the recessed portion 31, the arrangement thereof in the front-rear direction is regulated definitely, and the posture thereof is regulated such that the optical axis of the diffractor 13 is substantially parallel to the optical axis Lu of the front laser light Lf.

Figure 16A:
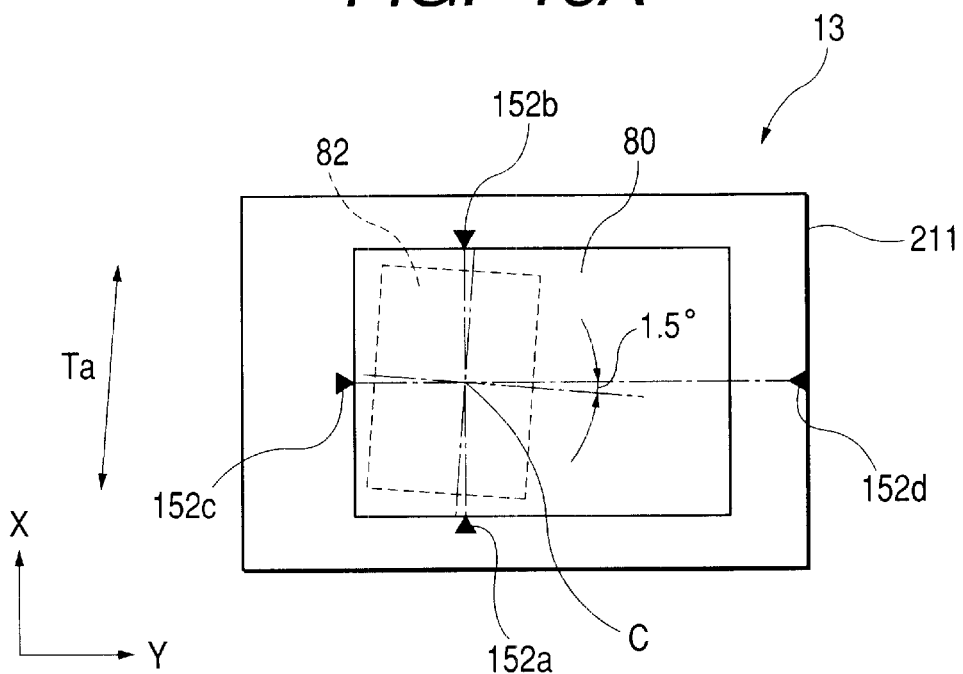
FIG. 16A is a plan view showing an attachment position of the 3-beam generating diffractor of the light source unit.
Figure 16B:
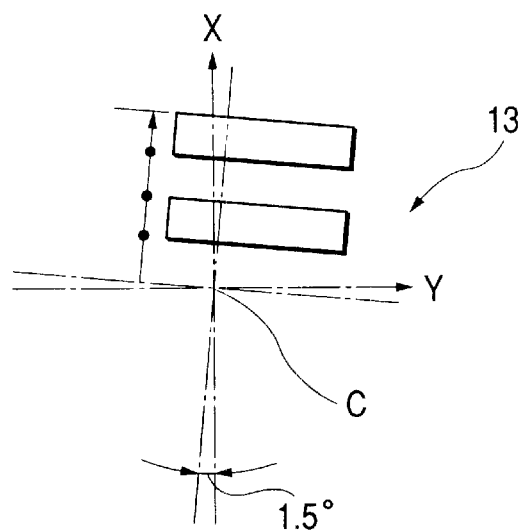
FIG. 16B is an enlarged view of the diffraction grating pattern thereof.

FIG. 16A is a plan view of the 3-beam generating diffractor 13. FIG. 16B is an enlarged view showing detailed grating pattern thereof. As shown in FIG. 16A, a pattern area 82 on which the diffraction grating is formed is arranged in effective area 80 formed in the diffractor 13. Four marks 152 are provided on the surface of the diffractor 13 in a portion outside of the effective area 80 in order to specify the position of the diffractor 13. These marks 152 (152a–152d) are provided so that these are respectively opposed to each other in two directions of the height direction and the width direction (planes perpendicular to the optical axis) of the package 20. The pattern of the 3-beam generating diffractor 13 is positioned in the direction of the angle of about 1.5° around the intersecting point regulated by these four marks 152 used as indicators. This regulated direction is the 3-beam generating direction.

The attachment position of this 3-beam generating diffractor 13 is adjusted as follows. Initially, turning on the semiconductor laser 11 such that the light emission point of the semiconductor laser 11 is easily recognized. Then, observing the light source unit 10 from the front. Next, positioning the 3-beam generating diffractor 13 while using the light emission point of the semiconductor laser 11 and the marks 152 as indicators. At the time, the 3-beam generating diffractor 13 is finely moved along the step wall 33 such that the intersecting point C of two lines connecting the opposed marks 152 is made coincident with the light emission point of the semiconductor laser 11. As the result, the 3-beam generating diffractor 13 is finely adjusted to a predetermined position.

Position Adjustment Method of the Separating Diffractor

Next, the position adjustment method of the separating diffractor 14 will be described. The separating diffractor 14 has been described referring to FIG. 10, and the diffraction grating surface of the separating diffractor 14 is composed of two kinds of diffraction gratings whose diffraction characteristics are different from each other with respect to the optical axis Lu as the boundary. Therefore, the optical paths of three light beams (returning light beam) Lf reflected by the optical disk 2 are deflected toward the photo detector 12, and simultaneously the three light beams Lf are respectively divided into two, and the three light beams Lf become six light beams and reach for the photo detector 12.

The two diffraction gratings in the separating diffractor 14 is divided in the direction perpendicular to the track in the border line along the track of the disk 2. Therefore, when the objective lens 4 is out of the optical axis, the intensity of the diffraction light beam in the two diffraction gratings changes corresponding to the degree of deviation. When the separation diffraction grating 14 is designed so that, when the objective lens 4 is on the optical axis, these intensity of the two diffraction light beam are the same, the deviation amount of the objective lens 4 with respect to the optical axis can be detected based on the amount of the difference of these intensity, and the position of the objective lens 4 can be feedback-controlled so that this deviation amount becomes zero. When such the feedback control is conducted, the suppression of the oscillation of the objective lens toward the track direction can be effectively carried out.

Therefore, the relative positions of the semiconductor laser 11 and the 3-beam generating diffractor 13 are set so that, when the objective lens 4 is located at a position (reference position) which coincides with the optical axis, respective intensities (received illuminance) of the divided returning light beams are the same.

In a condition of which the objective lens 4 is positioned at the reference position identical with the optical axis thereof, the objective lens is finely moved in the direction perpendicular to the border line with the separating diffractor 14 while monitoring a movement amount detecting signal such that the deviation amount detecting signal shows that the respective intensities of the divided light beams of the returning light beams are the same. That is, the attachment position of the separating diffractor 14 is adjusted such that the respective light beams divided by the separating diffractor 14 are cancelled each other.

In the manner described above, the diffraction direction in the 3-beam generating diffractor 13, and the separating diffractor 14 can be correctly positioned. Accordingly, because the optical axis Lu of the front laser light Lf and the diffraction characteristic (diffraction direction) of the 3-beam generating diffractor 13 in the light source unit 10 can be appropriately predetermined, the optically excellent light pick-up device can be realized. Further, in the light pick-up device of the present embodiment, the positioning adjustment of each optical element can be accurately carried out in a short time by using the marks 150 and 151. Further, in the light pick-up device of the present embodiment, because the tracking error detection of the objective lens 4 is accurately conducted by using the 3-beam method, the positioning adjustment of the diffractor 13 can be accurately carried out in a short time through the mark 152.

Other Embodiments

Incidentally, in the light pick-up device 1, the diffractors 13 and 14 are formed as respectively separated elements, however, an optical element into which these are structured as a single optical element, may be used. In this case, the structure in which the optical characteristic of the 3-beam generating diffractor 13 is provided on one surface, and on the other surface, the optical characteristic of the separating diffractor 14 is provided, may be preferable.

Further, the voltage signal S6 indicating the deviation amount of the objective lens 4 is detected from the divided light beams of the returning light beam of the main beam. Instead of this, the divided light beams of the returning light beam of one subsidiary beam may be made to be detectable, and the voltage signal S6 is detected from the divided light beams.

Further, in the optical system of the light pick-up device 1, there is also a case in which, not only the optical element shown in FIG. 2, but also an optical system such as a lens to convert the laser light Lf into the parallel light beam, a beam shaping prism to make uniform the light beam diameter in 2 directions perpendicular to the laser light beam, an optical opening regulating means to read the information of the optical disk having different specifications, and a wave length selective optical element, is included.

Further, the present invention can be applied to, not only the light pick-up device in which the laser light source 11, the photo detector 12, and the separating diffractor 14 are integrated as the light source unit 10, but also the light pick-up device in which these optical elements are directly mounted respectively to the frame 3.

Further, the mark for positioning is described relating to the triangle one, however, it is of course that the mark is not limited to the shape, but a dot, a cross, a polygon more than a square, etc., may be used. Further, the number of marks is not limited to the above.

Further, in the above embodiment, a reflector is provided in the cover plate of the package and a semiconductor substrate is provided in the main body thereof, however, a reversal arrangement may be realized. Accordingly, in the present specification, the words "main body" and "cover plate" are used as the words having the same meaning as the first and the second members constituting the package.

As has been described heretofore, according to the light pick-up device of the present invention, the returning light beam from the optical disc is divided by the separating diffractor in the directions perpendicular to the track direction of the optical recording medium, and according to respective illuminances of the divided light beams, the deviation amount of the objective lens to the optical axis is detected. Accordingly, by feedback controlling the objective lens driver by using the information of detected deviation amount, the objective lens can be made to become stationary at the desired position in a short time. Accordingly, a time period required for the oscillation attenuation of the objective lens can be shortened, thereby, a time period for the reproduction can be shortened. Further, the light source unit for this purpose can be provided.

Further, according to the present invention, the peak value of the received illuminance of each divided light beam is held, therefore, even when the illuminance of the returning light beam from the optical recording medium is fluctuated due to the depth of a plurality of pits forming the track, or the edge shape of the pit, the deviation amount of the objective lens can be correctly detected.

Still further, according to the present invention, since there is adopted the structure in which the arrangement direction of the linear lattice forming the diffraction pattern of the 3-beam generating diffractor is previously slanted with respect to the track direction, the position adjustment of the light spots of the respective beams formed on the track of the optical recording medium can be easily conducted.

Furthermore, according to the present invention, the marks indicating the relative positions of the respective optical elements are provided in order to facilitate the initial positioning of the optical elements. Accordingly, the assembling operation can be simply and accurately carried out in the condition of which the optical element is correctly positioned, can be simply and correctly carried out.

What is claimed is:

1. A light pick-up device comprising:

a laser light source for emitting a laser light beam;

an objected lens for converging the laser light beam on an optical recording medium;

a first diffractor for separating the light beam emitted form the laser light source and a light beam reflected by the optical recording medium into different optical paths, the first diffractor having a diffraction grating pattern for dividing the reflected light beam in a direction perpendicular to a track direction of the optical recording medium such that an optical axis of the reflected light beam becomes the center of division in order to generate a first divided light beam and a second divided light beam;

a photo detector for detecting illuminances of the first and the second divided light beams;

a second diffractor for dividing the laser light emitted from the laser light source into a main beam, which is to be reflected by the optical recording medium as the reflected beam, and two subsidiary as tracking beams; and a signal processor for generating a reproduction signal and a deviation detecting signal which detects a deviation amount of the objective lens from the optical axis, in accordance with the detection of the photo detector.

2. The light pick-up device as set forth in claim 1, wherein the signal processor includes a peak holder for holding respective peak values of the illuminances of the first and second divided light beams.

3. The light pick-up device as set forth in claim 1, wherein:

the photo detector includes two detecting sections each outputs a detection output signal; and the signal processor generates the reproduction signal by adding the two detection signals, and generates the deviation signal by obtaining a difference between the two detection signals.

4. The light pick-up device as set forth in claim 1, wherein the second diffractor has a diffraction grating pattern which is periodically arranged in a direction slanting a predetermined angle with respect to the track direction.

5. The light pick-up device as set forth in claim 1, wherein the laser light source, the first and second diffratctors, the photo detector and the signs processor are assembled into a common package body to constitute a light source unit.

6. The light pick-up device as set forth in claim 5, wherein the signal processor and the photo detector is provided on a common semiconductor substrate.

7. The light pick-up device as set forth in claim 6, wherein the laser light source unit is fixed on the semiconductor substrate, and the first and second diffractors are attached on the package body.

8. The light pick-up device as set forth in claim 1, further comprising:

a semiconductor substrate on which the photo detector is provided and the laser light source is mounted, and a first positioning mark provided on a surface of the substrate for specifying a mounting position of the laser light source.

9. The light pick-up device as set forth in claim 8, wherein the first positioning mark includes a first pair of marks arranged in a first direction parallel to the optical axis of the laser beam and a second pair of marks arranged in a second direction perpendicular to the first direction.

10. The light pick-up device as set forth in claim 8, wherein the positioning mark is simultaneously formed at the time of exposure by which the photo detector is formed on the surface of the semiconductor substrate.

11. The light pick-up device as set forth in claim 8, wherein the laser light source and the semiconductor are assembled into a common package body to constitute a light source unit.

12. The light pick-up device as set forth in claim 11, wherein the package includes:

a main body in which the semiconductor substrate is disposed;

a cover body attached to the main body so as to be slidable in a direction parallel to the optical axis of the laser beam;

an aperture formed on the main body, though which the beam emitted from the laser light source and the reflected beam pass; and a reflector attached to the cover body for guiding the reflected light toward the photo detector, the reflector is disposed where can be viewed from outside of the package body through the aperture.

13. The light pick-up device as set forth in claim 8, further comprising:

a second positioning mark provided on the surface of the substrate in the vicinity of the photo detector for specifying a relative position thereof with respect to an emission point of the laser light source.

14. The light pick-up device as set forth in claim 13, further comprising:

a third positioning mark provided on the second diffractor for specifying a relative position thereof with respect to an emission point of the laser light source.

15. The light pick-up device as set forth in claim 1, wherein the laser light source, the first diffractor, the photo detector and the signal processor are assembled within a common package.

16. The light pick-up device as set forth in claim 15, wherein the signal processor and the photo detector is provided on a common semiconductor substrate, and the laser light source is mounted on the semiconductor substrate.

17. The light pick-up device as set forth in claim 15, wherein the first and second diffractors are attached to the common package.

* * * * *